(No Model.)

G. ADAM.
SHINGLE BEVELING MACHINE.

No. 368,268. Patented Aug. 16, 1887.

Witnesses:
James Laurin
Avila Thomas

Inventor
Guillaume Adam
per:
J. Emile Varias & Co.
Attorneys

UNITED STATES PATENT OFFICE.

GUILLAUME ADAM, OF COOKSHIRE, QUEBEC, ASSIGNOR OF ONE-HALF TO JOSEPH ADAM, OF MONTREAL, CANADA.

SHINGLE-BEVELING MACHINE.

SPECIFICATION forming part of Letters Patent No. 368,268, dated August 16, 1887.

Application filed July 3, 1885. Serial No. 170,563. (No model.) Patented in Canada June 6, 1885, No. 21,817.

*To all whom it may concern:*

Be it known that I, GUILLAUME ADAM, a citizen of the Dominion of Canada, residing at Cookshire, in the county of Compton and Province of Quebec, Canada, have invented certain new and useful Improvements in Shingle-Beveling Machines; and I do hereby declare that the following is a full, clear, and exact description of the invention, which will enable others skilled in the art to which it appertains to make and use the same.

My invention relates to shingle-beveling machines in which the shingles are beveled with a saw revolving very rapidly, so as to make a smooth and clean cut, the power being supplied by means of a steam-engine or other motor.

Similar letters refer to similar parts throughout the several views.

Figure 1:
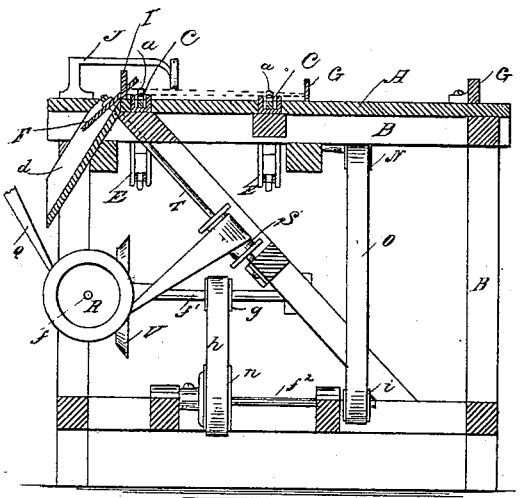
Figure 2:
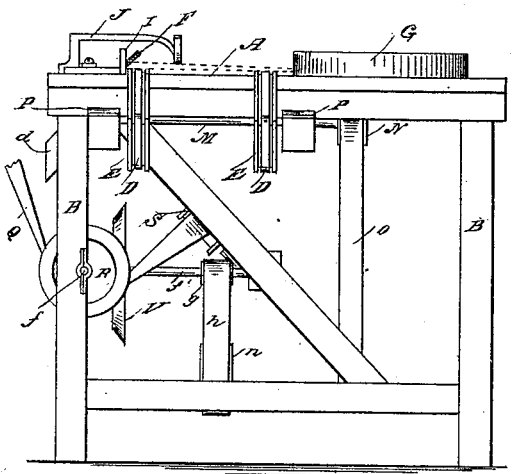
Figure 3:
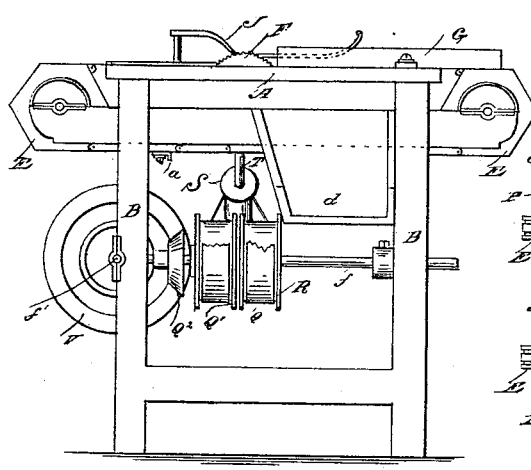
Figure 4:
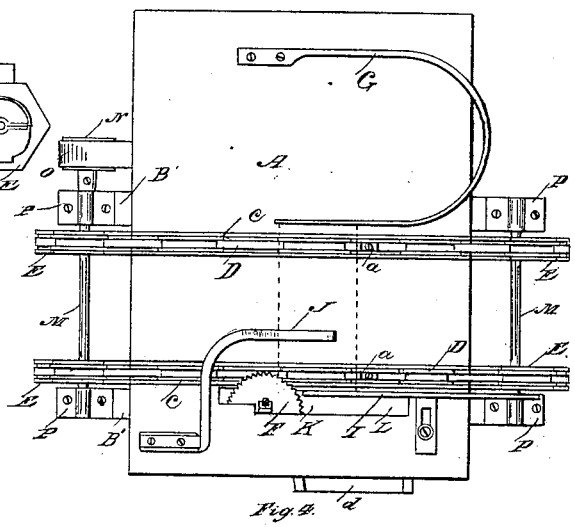

Figure 1 is a vertical section of the machine through its center; Fig. 2, a side elevation; Fig. 3, an elevation of adjoining side to Fig. 2; Fig. 4, a plan of the machine.

By referring to drawings it will be seen that B is the frame, on which is put table A, made in three separate parts, and put so as to leave two spaces, C, in between them. In these spaces two endless chains, D, slide along, propelled by means of the four hexagonal pulleys E. These endless chains are made with rectangular links, each link having the length of one side of hexagonal pulleys, the latter working together. These chains receive the shingles to be beveled. For this they are provided with a certain number of small projections, *a*, Figs. 1, 3, and 4, placed in pairs and exactly opposite each other, so that when a shingle is placed on the chains it is carried along by it, the shingle butting against the projections *a*. It is also held in a perpendicular position to the chains by means of the U-shaped spring G, which presses it against the bevel-regulator I, and it is held firmly down by means of the spring J. The shingle thus secured is brought under the saw F, revolving very rapidly, and beveled. On leaving the saw it soon gets free from the pressure of the springs, and at the turn of the chain drops off.

The bevel-regulator I is movable, and can be placed near to or far from the chain closest to it, so that the length of the bevel can be regulated at will.

The saw F passes through the table at K, Fig. 4, it being inclined to the required angle when put in position. In front of the saw can be seen in Fig. 4 the hole L. This is for the escape of the sawdust, which, after passing through L, comes down the chute or inclined plane *d*.

The hexagonal pulleys E E are fixed on the two shafts M M, which repose in their boxes P on the two beams B' B'. One of the shafts is provided with a pulley, N. It is on this pulley that the belt O, which serves to make the chain revolve, is put.

The whole machine is put in motion in the following manner: The motive power is supplied by means of the belt Q, which passes first around the loose pulley R, put on shaft *f*, then proceeds around pulley S, fixed on inclined shaft T, to which saw is attached, and then puts saw in motion. The belt then returns, passing under pulley Q', thus making the shaft *f* revolve. On the left end of this shaft is attached the friction bevel-wheel $Q^2$, which presses against a similar but larger one, V, making it revolve, and consequently its axle *f'*, which is provided with the pulley *g*. On this pulley is placed the belt *h*, which passes around pulley *n* of shaft $f^2$. On this shaft is fixed a second pulley, *i*, on which passes belt O. The latter, passing around pulley N, makes the hexagonal pulleys revolve, and consequently puts the chains in motion.

The advantages of this machine are that it bevels automatically and very rapidly. If there should be a hard or extra thick shingle, the frictional gear will slip and the feed of the shingles will be retarded and made proportional to the cutting-power of the saw. The saw will thus be prevented from heating by the shingles being pressed too hard against its teeth. The projections *a* are so arranged and the speed of chains so calculated that one operator can attend the machine.

This machine, saving a great deal of time, would be of great advantage to large shingle-manufacturers, as the quality of their shingles would be bettered by beveling.

Having thus described my invention, what I claim, and desire to secure by Letters Patent, is—

In a machine for beveling shingles, the combination, with the traveling chains for carrying the shingles and the inclined revolving saw for cutting their ends, of a driving-pulley secured on the saw-shaft and a belt for operating it, the guide-pulleys R and Q', mounted on shaft $f$, and revolved by the said driving-belt, one only of the said pulleys being secured to its shaft, and intermediate frictional driving-gear connecting the shaft $f$ with the traveling chains, so that the feed is rendered automatic and proportional to the cutting-power of the saw, substantially as set forth.

In testimony whereof I affix my signature in presence of two witnesses.

GUILLAUME ADAM.

Witnesses:
E. S. ORR,
FRANCIS PLANNSE.